(12) United States Patent
Yokoyama et al.

(10) Patent No.: US 11,300,488 B2
(45) Date of Patent: Apr. 12, 2022

(54) AUTOMATIC ANALYSIS DEVICE

(71) Applicant: HITACHI HIGH-TECHNOLOGIES CORPORATION, Tokyo (JP)

(72) Inventors: Koki Yokoyama, Tokyo (JP);
Nobuyuki Isoshima, Tokyo (JP);
Takenori Okusa, Tokyo (JP);
Shigeyuki Sasaki, Tokyo (JP);
Michiharu Watanabe, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 225 days.

(21) Appl. No.: 16/480,337

(22) PCT Filed: Jan. 18, 2018

(86) PCT No.: PCT/JP2018/001313
§ 371 (c)(1),
(2) Date: Jul. 24, 2019

(87) PCT Pub. No.: WO2018/147029
PCT Pub. Date: Aug. 16, 2018

(65) Prior Publication Data
US 2019/0376883 A1    Dec. 12, 2019

(30) Foreign Application Priority Data
Feb. 7, 2017   (JP) .............................. JP2017-020000

(51) Int. Cl.
*G01N 1/44*       (2006.01)
*B01L 7/00*       (2006.01)
(Continued)

(52) U.S. Cl.
CPC .................. *G01N 1/44* (2013.01); *B01L 7/00* (2013.01); *B01L 9/06* (2013.01); *B01L 2300/08* (2013.01);
(Continued)

(58) Field of Classification Search
CPC combination set(s) only.
See application file for complete search history.

(56) References Cited

U.S. PATENT DOCUMENTS

| 2,590,212 A | * | 3/1952 | Samuels | ................ | H05B 3/342 |
| | | | | | 604/291 |
| 2,610,286 A | * | 9/1952 | Cox | ......................... | H05B 3/56 |
| | | | | | 338/212 |

(Continued)

FOREIGN PATENT DOCUMENTS

| CA | 2 173 862 A1 | 4/1995 |
| JP | 61-63140 U | 4/1986 |

(Continued)

OTHER PUBLICATIONS

BriskHeat. (Jun. 24, 2011). How to easily select and install heating tape. Retrieved May 4, 2021, from https://www.youtube.com/watch?v=zBkUs57Ub94 (Year: 2011).*

(Continued)

*Primary Examiner* — Samuel P Siefke
*Assistant Examiner* — Tingchen Shi
(74) *Attorney, Agent, or Firm* — Mattingly & Malur, PC

(57) ABSTRACT

Temperature uniformity of a reaction liquid in a plurality of reaction containers of an automatic analysis device is maintained by a heat block. A strip-shaped heater heats the heat block, and is wound and attached on an outer circumference of the heat block so that both end regions of the strip-shaped heater are adjacent to each other. The strip-shaped heater includes a heat generating resistor that is heated by applying an electric current, an insulating film sandwiching the heat generating resistor, and first and second electrical feed lines that are attached to both end portions of the heat generating resistor and supply power to the heat generating resistor. The width of the heat generating resistor in both end regions of (Continued)

the strip-shaped heater is formed to be narrower than the width of the heat generating resistor in the other region thereof.

5 Claims, 11 Drawing Sheets

(51) Int. Cl.
*B01L 9/06* (2006.01)
*G01N 35/02* (2006.01)
*G01N 35/00* (2006.01)

(52) U.S. Cl.
CPC ............... *B01L 2300/1805* (2013.01); *B01L 2300/1883* (2013.01); *G01N 35/02* (2013.01); *G01N 2035/00376* (2013.01)

(56) References Cited

U.S. PATENT DOCUMENTS

| | | | | |
|---|---|---|---|---|
| 5,068,517 A * | 11/1991 | Tsuyuki | ................. | H05B 3/265 |
| | | | | 219/543 |
| 5,508,198 A * | 4/1996 | Ganz | .................. | B01L 7/00 |
| | | | | 422/307 |
| 5,939,312 A * | 8/1999 | Baier | .................. | B01L 3/50851 |
| | | | | 435/287.2 |
| 6,068,978 A * | 5/2000 | Zaun | .................. | B01L 3/502 |
| | | | | 422/141 |
| 6,359,284 B1 * | 3/2002 | Hayashi | ............... | G01N 21/645 |
| | | | | 250/458.1 |
| 2010/0065543 A1 * | 3/2010 | Dubey | ................. | H05B 3/34 |
| | | | | 219/213 |
| 2016/0008814 A1 * | 1/2016 | Handique | ......... | B01L 3/502761 |
| | | | | 435/6.11 |

FOREIGN PATENT DOCUMENTS

| | | |
|---|---|---|
| JP | 06-210189 A | 8/1994 |
| JP | 09-89900 A | 4/1997 |
| JP | 2001-083160 A | 3/2001 |
| WO | 2004/071665 A1 | 8/2004 |

OTHER PUBLICATIONS

Ultra-Thin Flexible Heaters. (Mar. 2, 2015). Retrieved May 4, 2021, from https://web.archive.org/web/20150302014113/http://www.pelonistechnologies.com/ultra-thin-heaters (Year: 2015).*
Silicone rubber Heating tapes (bs0). (Nov. 4, 2016). Retrieved May 4, 2021, from https://web.archive.org/web/20161104230652/http://www.briskheat.com/products/heaters/heating-tapes-and-cords/xtremeflex-silicone-rubber-heating-tapes/silicone-rubber-heating-tapes-bs0.html# (Year: 2016).*
International Search Report of PCT/JP2018/001313 dated Apr. 17, 2018.
Extended European Search Report received in corresponding European Application No. 18751057.3 dated Nov. 23, 2020.

* cited by examiner

[Fig. 1]
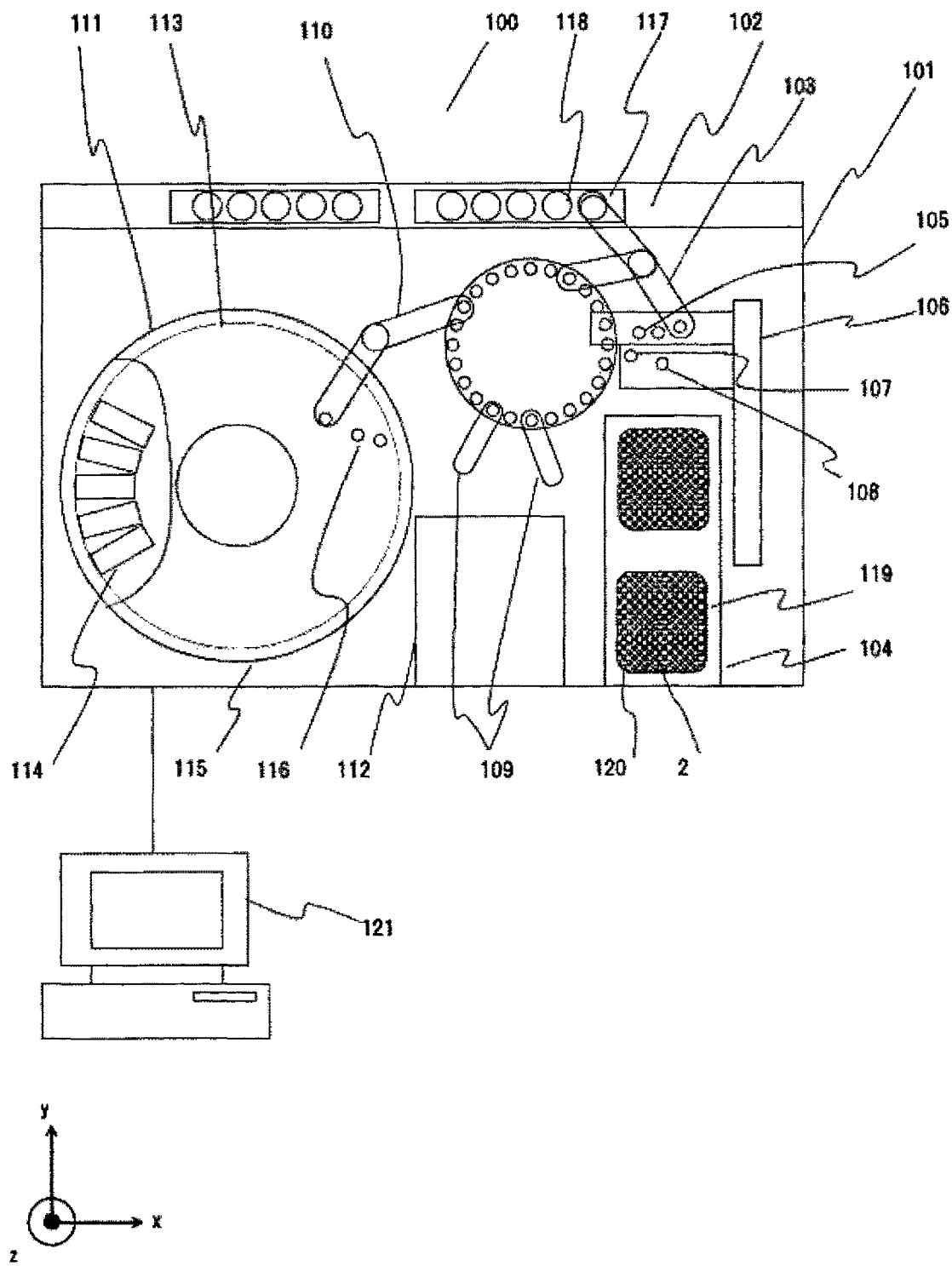

[Fig. 2]
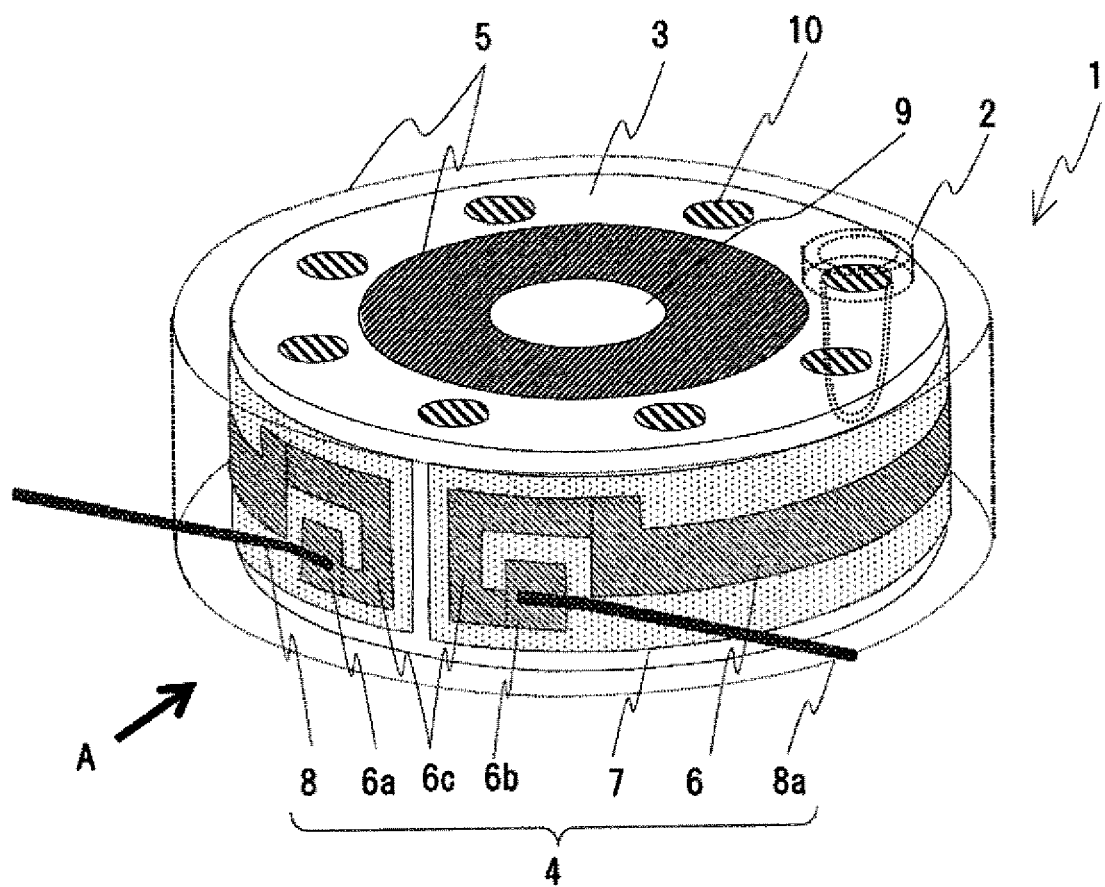
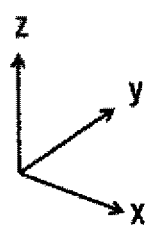

[Fig. 3]
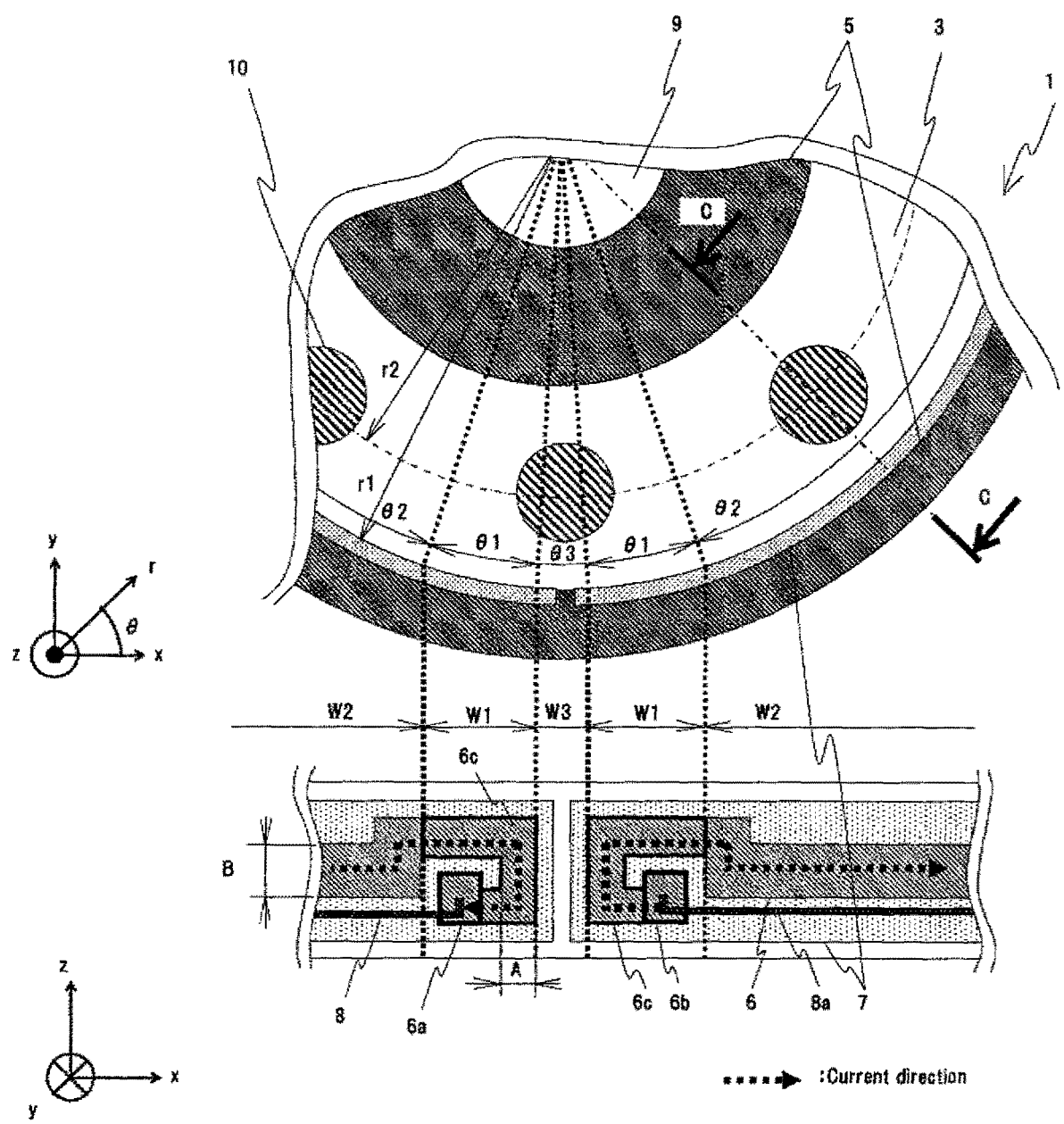

[Fig. 4]
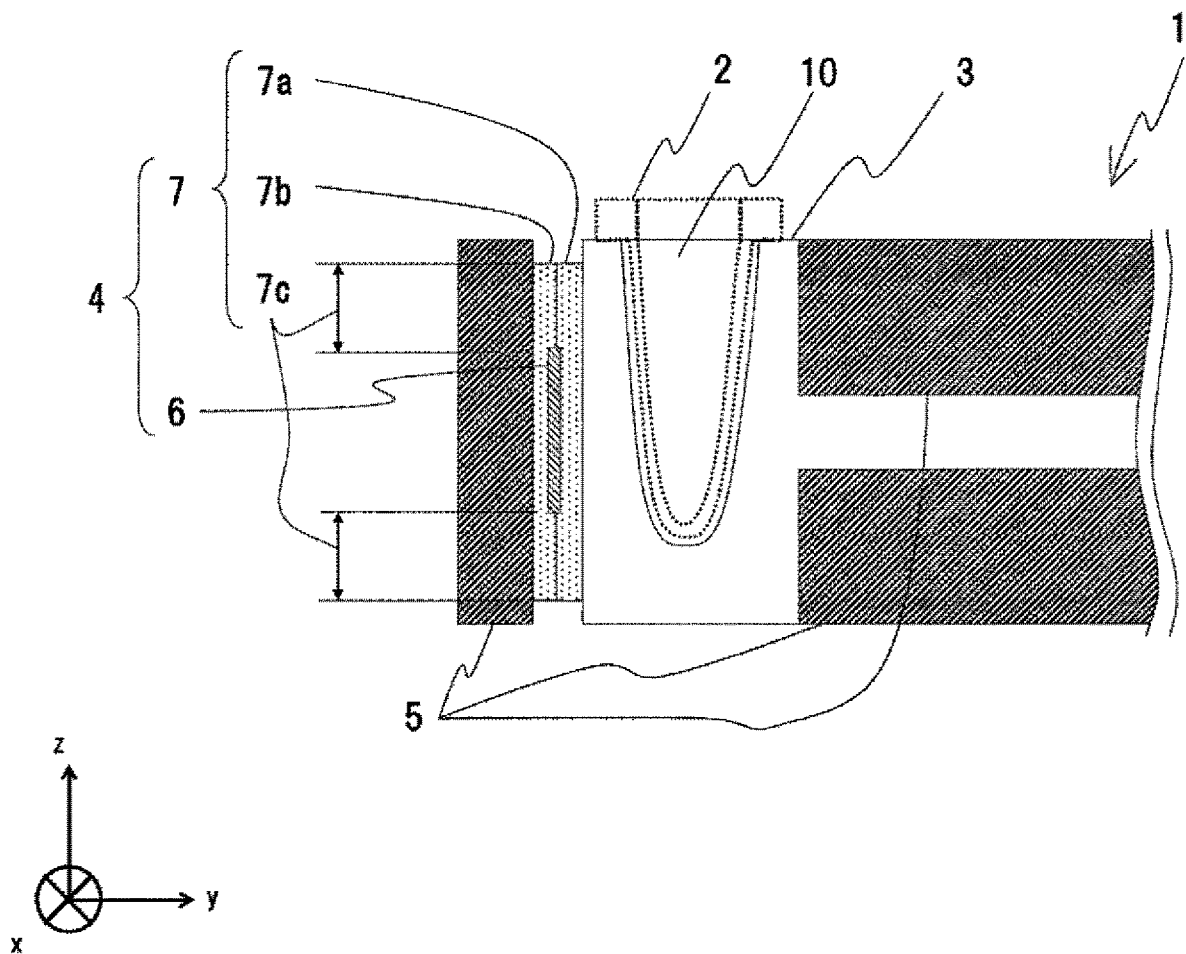
[Fig. 5]
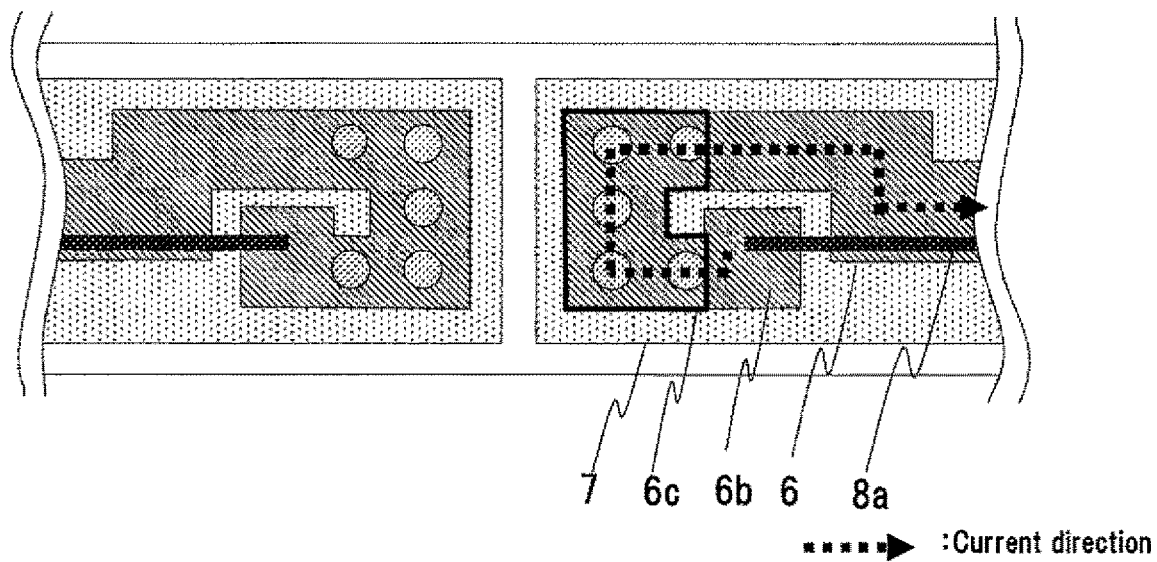
▪▪▪▪▶ :Current direction

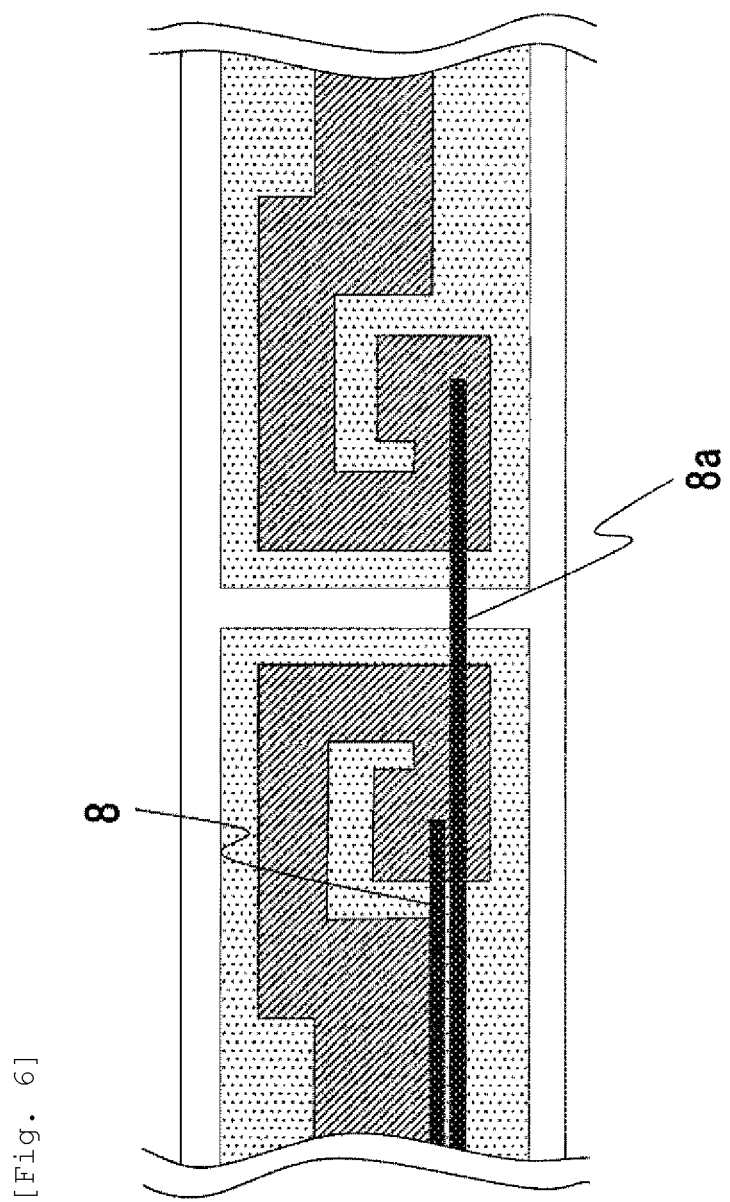

[Fig. 7]
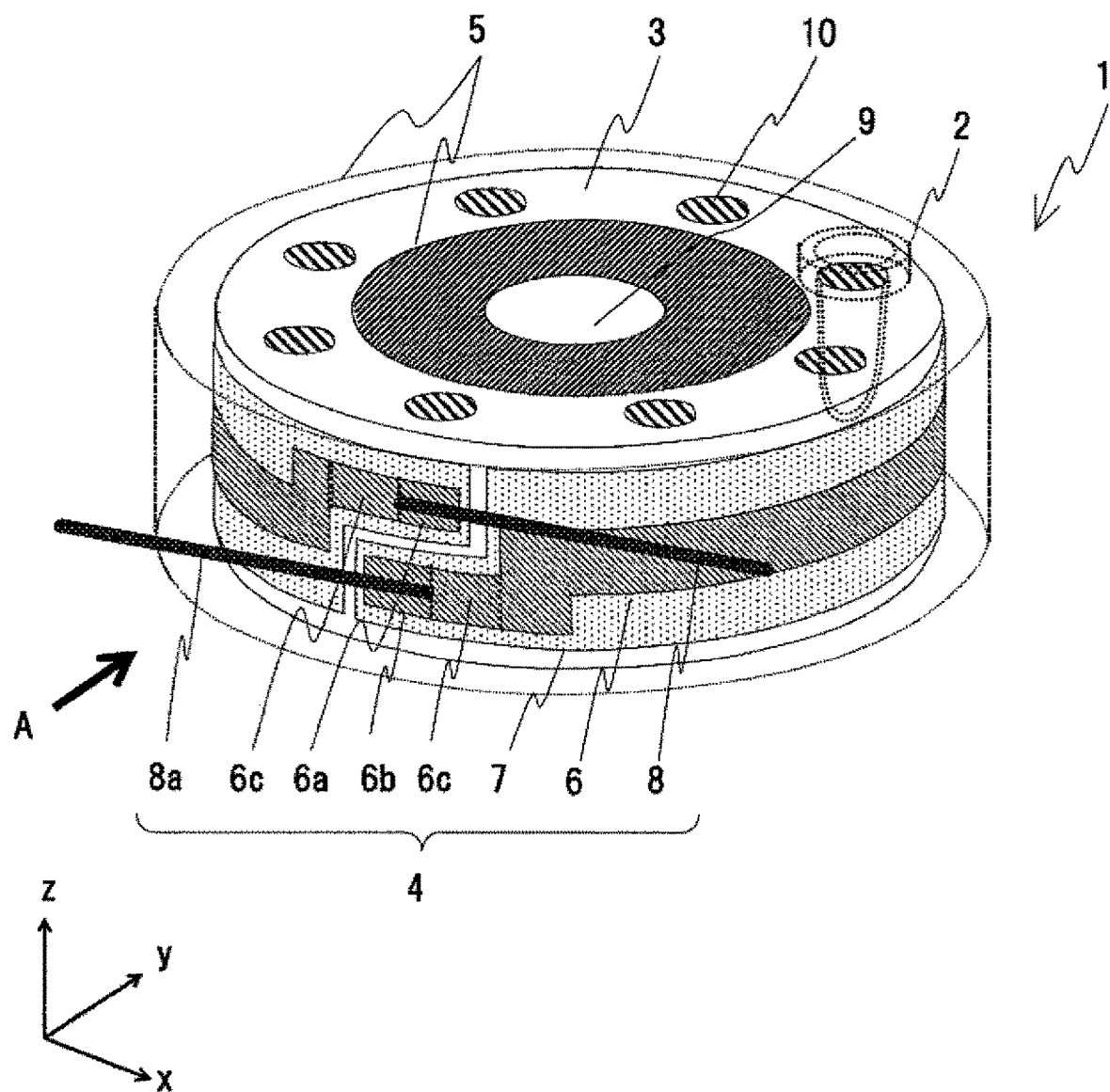

[Fig. 8]
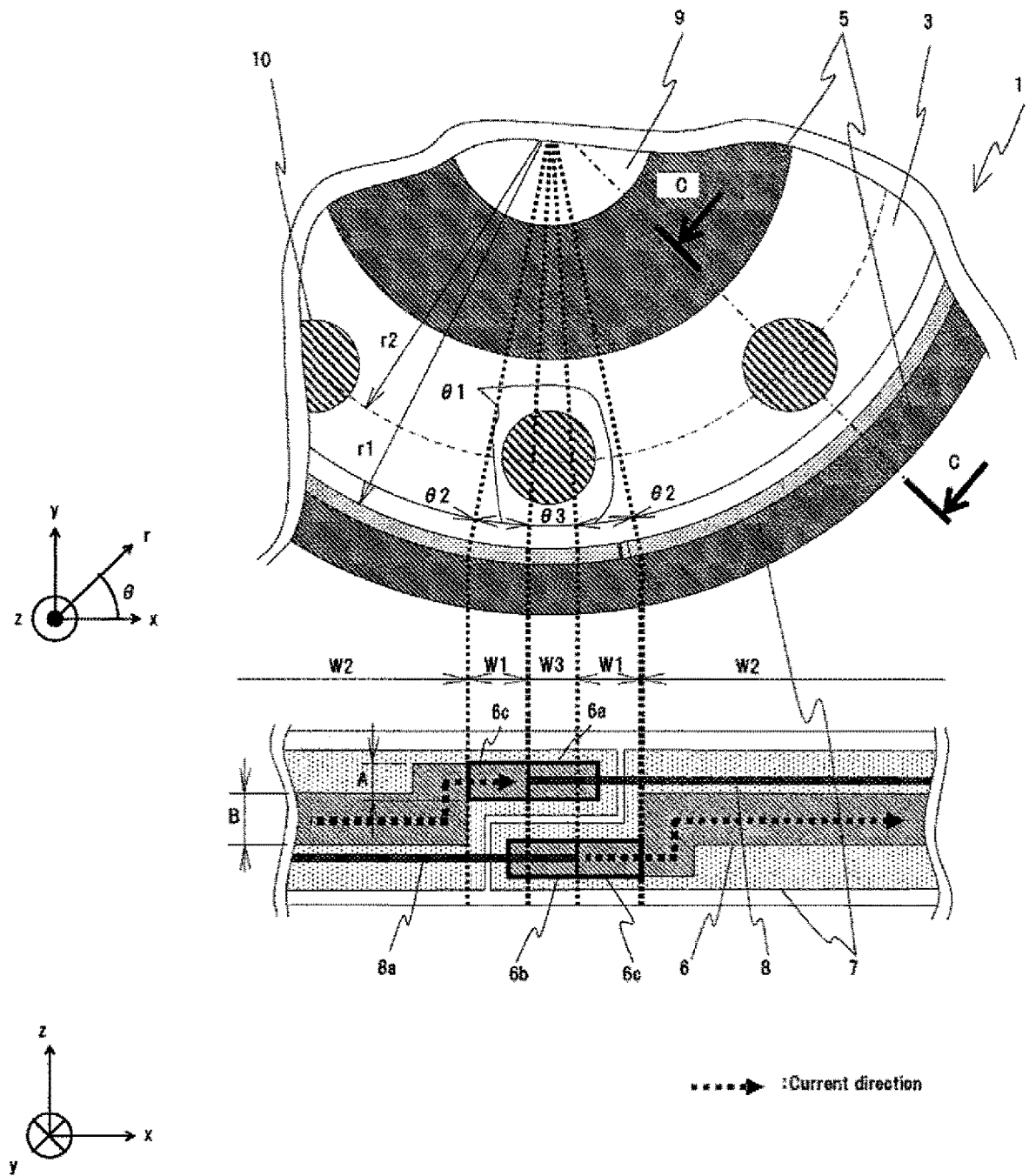

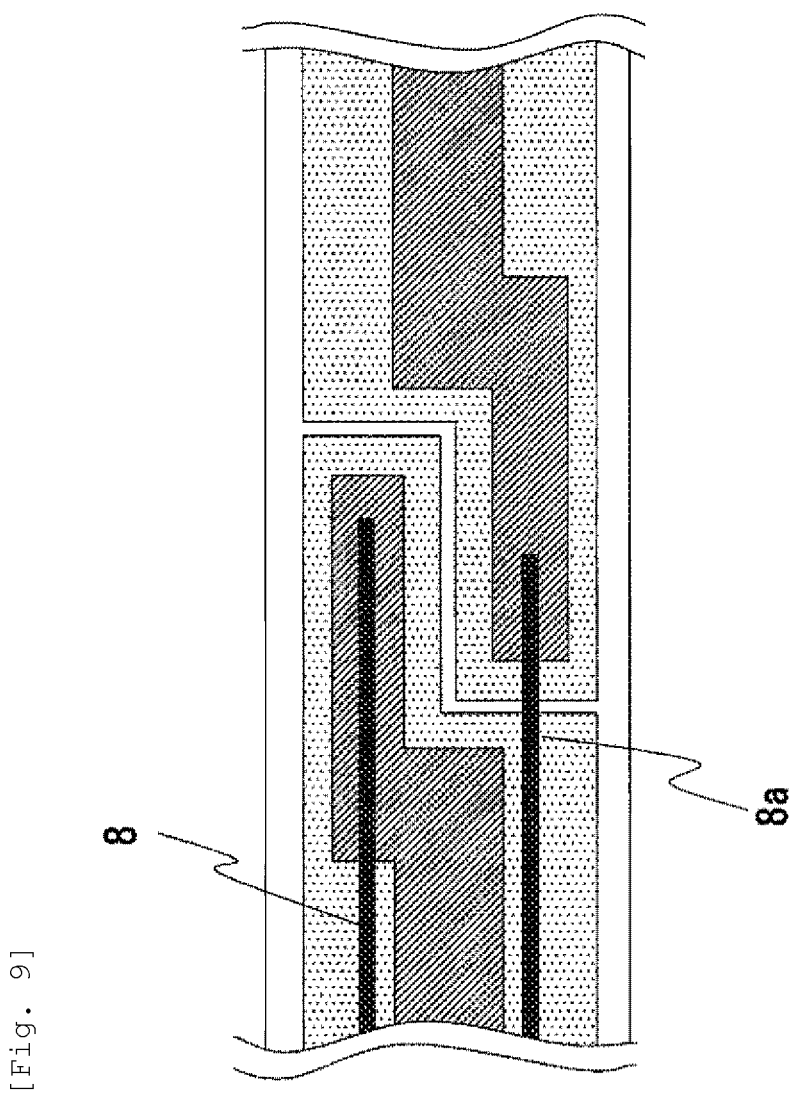
[Fig. 9]

[Fig. 10]
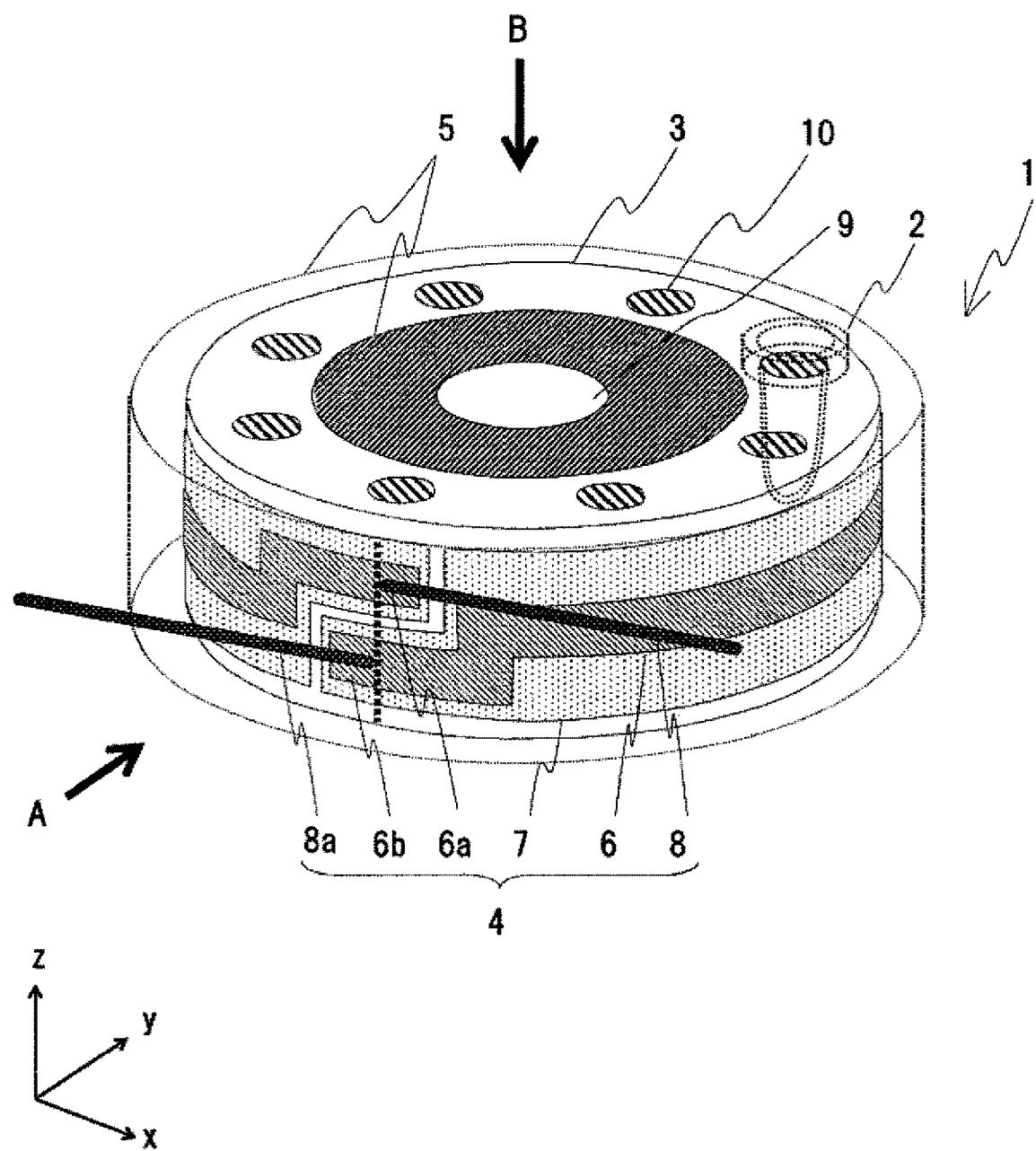

[Fig. 11]
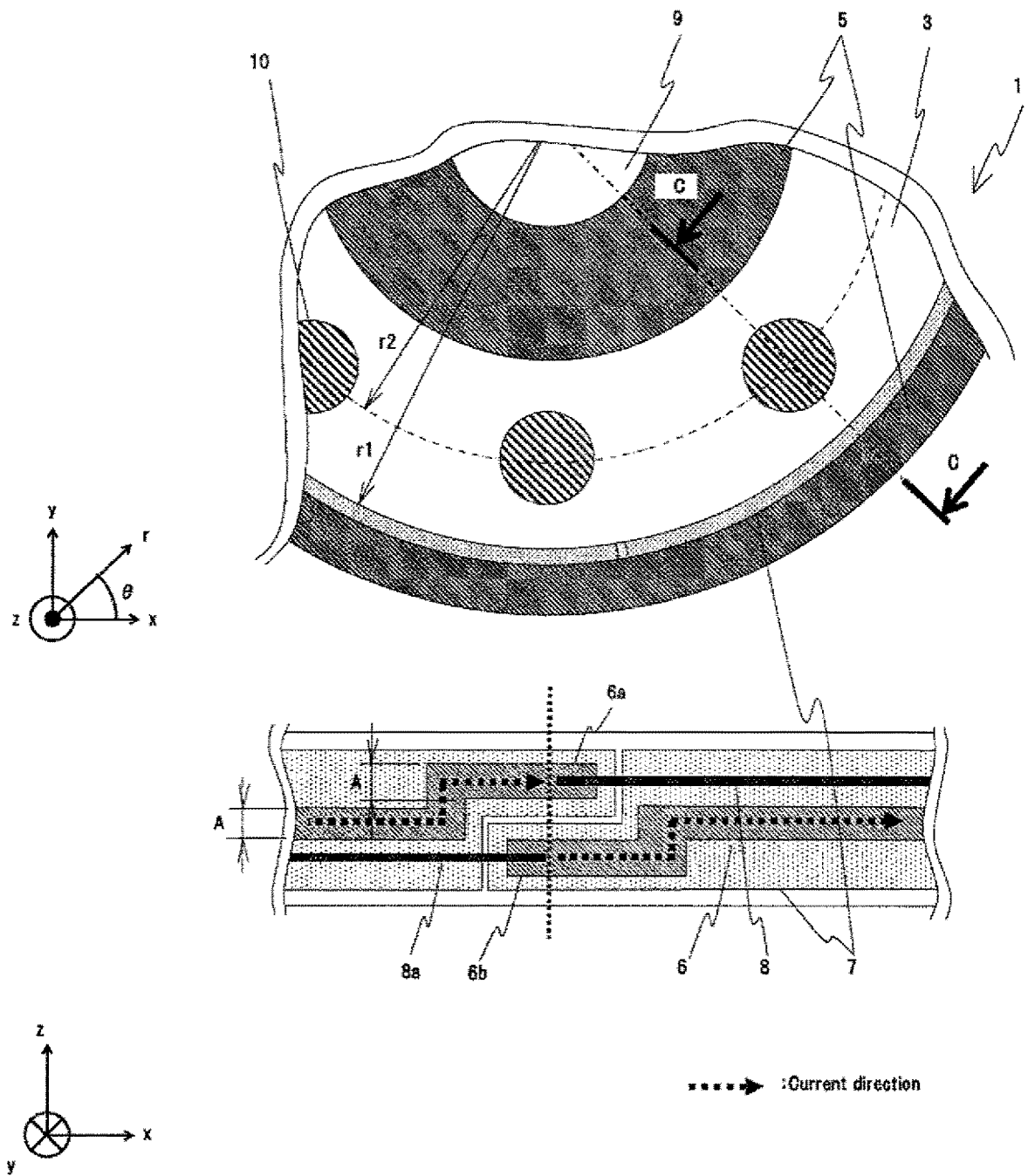

[Fig. 12]
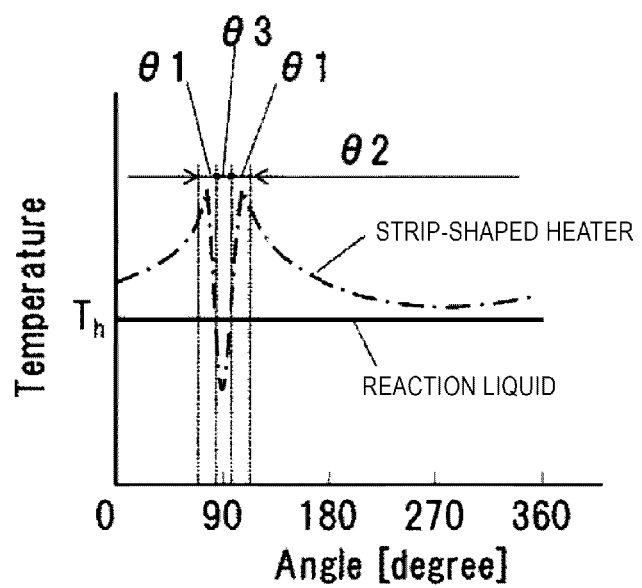

AUTOMATIC ANALYSIS DEVICE

TECHNICAL FIELD

The present invention relates to an automatic analysis device which has the function to regulate the temperature of a reactant to a prescribed temperature range.

BACKGROUND ART

In a clinical examination, a sample test is carried out in which analysis of components and check for presence/absence of microorganisms in a sample such as blood or urine are conducted. In the recent years, higher efficiency, labor saving, and higher accuracy in sample tests have been demanded and automatic analysis devices which automatically conduct them have been developed and used widely in clinical examinations. Among automatic analysis devices are biochemical automatic analysis devices which conduct biochemical tests and immunological automatic analysis devices which conduct immunological tests. For example, in a biochemical automatic analysis device, a colorimetric analysis is made to calculate the target component concentration, in which a color is formed through chemical reaction by adding a reagent to react with an objective substance to a sample and this color is photometrically measured as a temporal change in absorbance by the absorptiometric method to find its absorbance change rate, etc. and the rate is substituted in a calibration curve. In an immunological automatic analysis device, an immunological analysis is made to calculate the target component concentration, in which a specific substance contained in a sample as an object of measurement is labeled by antigen-antibody reaction as a reaction specific to the substance and the amount of the labeled substance is quantified and the quantified amount is substituted in a calibration curve.

In these reactions, there is an adequate temperature at which the reaction proceeds most efficiently. Generally, in a sample test which targets a substance existing in the human body, the reaction efficiency is high at a temperature of 37° C., a temperature near the human body temperature. For this reason, many automatic analysis devices use a heat block or the like which controls the chemical reaction of a substance as an object of measurement to 37° C. or so.

Patent Literature 1 discloses that "wires for a heater and a temperature sensor constituting a heat block are passed through the rotational tube axis of the heat block and wound around the rotational tube axis several turns. Flexible strip-shaped wires are used in the winding area and fixed using a leaf spring which can be loosened and tightened together with the wires, as a guide. An interlocking detecting plate which interlocks with the rotational tube axis and detects the wires tightened to a certain degree and inversely rotates a stepping motor, and a position sensor are provided. The order of positions for holding a vessel over the heat block is set to several pitches per cycle and rotation control is performed to correct the tightness so that while inversely rotating the heat block for several positions once in several cycles, the first holding position is returned to the vessel holding position a after several cycles and the cumulative wire tightness becomes 0."

CITATION LIST

Patent Literature

Patent Literature: Japanese Unexamined Patent Application Publication No. 2001-83160

SUMMARY OF INVENTION

Technical Problem

In an automatic analysis device, chemical reaction of a substance as an object of measurement is made around 37° C. as mentioned above, but when the quantity of the reagent or sample is further decreased or when the test accuracy is increased, the temperature uniformity of the reaction liquid must be further increased. Therefore, a heat block which enables improvement of the temperature uniformity of each reaction liquid is demanded. The invention described in Patent Literature 1 is an invention concerning the heat block which is heated by a heater but it does not mention the temperature uniformity inside the heat block.

The present invention has been made in view of the above problem and relates to an automatic analysis device and has an object to provide an automatic analysis device which realizes improvement of temperature uniformity of reaction liquids in a plurality of reaction containers held by a heat block using a simple method and can improve the measurement accuracy stability while suppressing an increase in the size of the device itself.

Solution to Problem

In order to achieve the above object, the first embodiment of the automatic analysis device according to the present invention includes: a heat block which includes a plurality of positions on which reaction containers in which reaction liquid mixing a reagent and a sample is injected are mounted; and a strip-shaped heater which heats the heat block, in which the strip-shaped heater is wound and attached on the outer circumference of the heat block so that both end regions of the strip-shaped heater are adjacent to each other; the strip-shaped heater includes a heat generating resistor which generates heat by applying an electric current, an insulating film which electrically insulates with respect to an outside portion by disposing to sandwich the heat generating resistor, and a first and a second electricity feeding lines which are attached to both end portions of the heat generating resistor and supply power to the heat generating resistor; and the width of the heat generating resistor in both end regions of the strip-shaped heater is formed to be narrower than the width of the heat generating resistor in the other region thereof.

The second embodiment of the automatic analysis device according to the present invention includes: a heat block which includes a plurality of positions on which reaction containers in which reaction liquid mixing a reagent and a sample is injected are mounted; and a strip-shaped heater which heats the heat block, in which the strip-shaped heater is wound and attached on the outer circumference of the heat block so that both end regions of the strip-shaped heater are adjacent to each other; the strip-shaped heater includes a heat generating resistor which generates heat by applying an electric current, an insulating film which electrically insulates with respect to an outside portion by disposing to sandwich the heat generating resistor, and a first and a second electricity feeding lines which are attached to both end portions of the heat generating resistor and supply power to the heat generating resistor; both end regions of the strip-shaped heater are disposed side by side in a direction perpendicular to the longitudinal direction of the strip-shaped heater; the heat generating resistor has a uniform cross-sectional area width perpendicular to an electric current applying direction through which the first electricity feeding line and the second electricity feeding line are passed; and a junction portion to which the first electricity feeding line is joined and a junction portion to which the second electricity feeding line is joined are positioned on both end portion sides of the heat generating resistor other than the position aligned in the direction perpendicular to the longitudinal of the strip-shaped heater.

Advantageous Effects of Invention

According to the present invention, in an automatic analysis device, improvement of temperature uniformity of reaction liquids held by a heat block can be realized by a simple method.

BRIEF DESCRIPTION OF DRAWINGS

FIG. 1 is a plan view illustrating an automatic analysis device of the present invention.

FIG. 2 is an example of a schematic configuration view schematically illustrating a configuration of a heat block as a main portion of the automatic analysis device according to an embodiment of the present invention.

FIG. 3 is a schematic front view in which heat insulation material is omitted in a side configuration of the heat block viewed in a direction of arrow A and a schematic plan view which schematically illustrates atop configuration of the heat block viewed in a direction of arrow B, illustrated in FIG. 2.

FIG. 4 is a schematic sectional view schematically illustrating a sectional configuration of the heat block viewed in a direction of section C-C illustrated in FIG. 3.

FIG. 5 is an example modifying a shape of a narrow portion of heat generating resistor in the schematic front view in FIG. 3.

FIG. 6 is an example modifying an attaching direction of an electricity feeding line in the schematic front view in FIG. 3.

FIG. 7 is an example of a schematic configuration view schematically illustrating a configuration of the heat block as a main portion of an automatic analysis device according to another embodiment.

FIG. 8 is a schematic front view in which heat insulation material is omitted in a side configuration of the heat block viewed in a direction of arrow A and a schematic plan view which schematically illustrates atop configuration of the heat block viewed in a direction of arrow B, illustrated in FIG. 6.

FIG. 9 is a schematic front view illustrating an example modifying an attaching state of an electricity feeding line in the schematic front view in FIG. 8.

FIG. 10 is an example of a schematic configuration view schematically illustrating a configuration of the heat block as a main portion of an automatic analysis device according to yet another embodiment.

FIG. 11 is a schematic front view in which heat insulation material is omitted in a side configuration of the heat block viewed in a direction of arrow A and a schematic plan view which schematically illustrates atop configuration of the heat block viewed in a direction of arrow B, illustrated in FIG. 10.

FIG. 12 is an example of a temperature distribution of a heat block according to an example of the present invention.

DESCRIPTION OF EMBODIMENTS

Next, an embodiment of an automatic analysis device 100 according to the present invention will be described referring to drawings. In all the drawings that illustrate the embodiment, elements with the same functions are basically designated by the same reference signs. Since the drawings illustrate the embodiment schematically, elements may be omitted or simplified as compared with actual elements. The present invention is not limited to the automatic analysis device 100 but can also be applied to an analysis device such as a DNA analysis device.

FIG. 1 is a schematic general configuration plan view which schematically illustrates the general configuration of an automatic analysis device according to an embodiment of the present invention.

The automatic analysis device 100 according to this embodiment has a heat block 1 which causes a reaction liquid as a mixture of a sample used for a test and a reagent to react at a given temperature for a given time period.

The automatic analysis device 100 shown in the figure is configured so as to include, in addition to the above heat block 1, on an operation table 101, a sample rack mounting portion 102, sample dispensing mechanism 103, sample dispensing tip and reaction container holding member mounting portion 104, sample dispensing tip and reaction container discarding hole 105, sample dispensing tip and reaction container transport mechanism 106, sample tip mounting position 107, reaction container stirring device 108, reaction liquid suction mechanism 109, reagent dispensing mechanism 110, reagent refrigerator 111, and detection unit 112. In addition, in the reagent refrigerator 111, a reagent disc 3113, reagent container 114, and reagent disc 3 cover 115 are integrally provided and the reagent disc 3 cover 115 has a dispensing hole 116.

The heat block 1, which is intended to hold a plurality of reaction containers 2 at a given temperature, is located in a prescribed position over the operation table 101 of the automatic analysis device 100 so that a reaction container 2 can be moved in the circumferential direction by rotational movement. Consequently, the reaction container 2 can be placed in the working positions of the sample dispensing tip and reaction container transport mechanism 106, sample dispensing mechanism 103, and reagent dispensing mechanism 110.

The sample rack 117 mounting portion 102 is located in a prescribed position over the operation table 101 of the automatic analysis device 100 so that a plurality of sample racks 117 can be mounted. A sample rack 117 can be moved in an X-axis direction according to a control signal. In the sample rack 117, a plurality of sample containers 118 each of which retains a sample containing the antigen to be analyzed are arranged and housed.

The sample dispensing tip and reaction container holding member mounting portion 104 is located in a prescribed position over the operation table 101 of the automatic analysis device 1 and a plurality of sample dispensing tip and reaction container holding members 119 are mounted on it. In the sample dispensing tip and reaction container holding members 119, unused sample dispensing tips 120 and reaction containers 2 are arranged and housed.

The sample dispensing mechanism 103 is located in a prescribed position over the operation table 101 of the automatic analysis device 100 and according to a control signal, the sample dispensing tip 120 is mounted from the sample tip mounting position 105, the sample dispensing tip 120 is immersed in the sample in the sample container 118, and the sample is sucked into the sample dispensing tip 120 and collected. Also, according to a control signal, the sample dispensing tip 120 is immersed in the reagent in the reaction container 2 retaining the reagent to discharge and dispense the sample in the reaction container 2. Furthermore, according to a control signal, by repeating the motion of sucking the reaction liquid of the sample and reagent retained in the reaction container 2 and then discharging it, the reaction liquid in the reaction container 2 is stirred.

The sample dispensing tip 120 and reaction container transport mechanism 106, which is intended to hold and move the sample dispensing tip 120 and the reaction container 2, moves and displaces the sample dispensing tip 120 and the reaction container 2 over the operation table 101 of the automatic analysis device 100. The sample dispensing tip and reaction container transport mechanism 106 places the sample dispensing tip 120 and the reaction container 2 in a desired three-dimensional position over the operation table 101 according to a control signal.

The reagent refrigerator 111 is located in a prescribed position over the operation table 101 of the automatic analysis device 100 and holds a plurality of reagent containers 114 which retain a reagent containing an antigen used for antigen-antibody reaction and a labeling substance, at a low temperature. The reagent containers 114 are housed on a reagent disc 3 which can hold a plurality of reagent containers 114. The reagent refrigerator 111 is provided with a reagent disc 3 cover 115 to put in or take out the reagent. On the reagent disc 3 cover 115, a dispensing hole 116 is provided to enable the reagent dispensing mechanism 110 to suck the reagent retained in the reagent container 114 without opening and closing the reagent disc 3 cover 115. The reagent disc 3113 can be rotated around the Z direction (front-back direction) as an axis so that the reagent to be used for a test can be moved to just under the dispensing hole 116 according to a control signal.

The reagent dispensing mechanism 110, which is located in a prescribed position over the operation table 101 of the automatic analysis device 100, immerses a nozzle through the dispensing hole 116 in the reagent in the reagent container 114 housed on the reagent disc 3 in the reagent refrigerator according to a control signal and sucks and collects the sample. Also, according to a control signal, the sample is discharged and dispensed into an empty reaction container 2 placed over the heat block 1.

In the control portion 121, the control portion of the automatic analysis device 100 receives a request for measurement as entered from the operator through a keyboard, touch panel or the like, creates an analysis plan, and sends the created analysis plan to the analysis device so that according to the analysis plan, a control signal is sent to each mechanism to control operation. In the control portion, a memory which stores analysis request information, analysis parameters, analysis results and so on may be provided.

More specifically, the sample dispensing tip and reaction container transport mechanism 106 moves to above the sample dispensing tip and reaction container holding member 119, moves down and grasps an unused reaction container 2 and moves up, then moves to above a reaction container installation hole 10 of the heat block 1, and moves down to install the reaction container 2.

The reagent dispensing mechanism 110 rotationally moves to above the dispensing hole 116 of the reagent disc 3 cover 115 and moves down, makes the tip of the reagent dispensing mechanism 110 contact the reagent in a specified reagent container 114 and sucks a specified amount of reagent. Then, the reagent dispensing mechanism 110 is moved up and moved to above the reagent discharge position of the heat block 1 to discharge the reagent in the reaction container 2.

Next, the sample dispensing tip and reaction container transport mechanism 106 moves to above the sample dispensing tip and reaction container holding member 119, moves down, grasps an unused sample dispensing tip 120, moves up and moves to above the sample dispensing tip mounting position 121, and moves down to install the sample dispensing tip 120. The sample dispensing mechanism 103 can rotate and move up and down, and it moves to above the sample dispensing tip mounting position 121 and moves down to mount the sample dispensing tip 120 on the tip of the sample dispensing mechanism 103. The sample dispensing mechanism 103 on which the sample dispensing tip 120 has been mounted moves to above the sample container 118 placed in the transport rack, moves down and sucks a specified amount of the sample held by the sample container 118. The sample dispensing mechanism 103 which has sucked the sample moves to the sample discharge position of the heat block 1, moves down and discharges the sample into the reaction container 2 over the heat block 1, in which the sample has been dispensed. After discharging the sample, the sample dispensing mechanism 103 moves to above the sample dispensing tip 120 and reaction container 2 discarding hole and discards the used sample dispensing tip 120 into the discarding hole.

The reaction container 2 in which the sample and reagent have been discharged is moved to the reaction container 2 transport position by rotation of the heat block 1 and transported to the reaction container stirring device 108 by the sample dispensing tip 120 and reaction container 2 transport mechanism. The reaction container stirring device 108 mixes the sample and reagent in the reaction container 2 by rotational movement of the reaction container 2 with autorotation and orbital rotation. The reaction container 2 in which stirring is finished is moved back to the reaction container transport position of the heat block 1 by the sample dispensing tip and reaction container transport mechanism 106. The reaction liquid suction mechanism 109, which can rotate and move up and down, moves to above the reaction container 2 in which the sample and reagent have been dispensed and mixed and have stayed over the heat block 1 for a prescribed time period, moves down and sucks the reaction liquid in the reaction container 2. The reaction liquid sucked by the reaction liquid suction mechanism 109 is sent to the detection unit 112 where the object of measurement is detected. The control portion calculates a measurement result from the detected value of the object of measurement and displays it. The reaction container 2 from which the reaction liquid has been sucked is moved to the reaction container discarding position 108 by rotation of the heat block 1 and moved from the heat block 1 to above the sample dispensing tip and reaction container discarding hole 105 by the sample dispensing tip and reaction container transport mechanism 106 and discarded.

Next, the structure and function of the heat block 1 which stores the reaction liquid retained in the reaction container 2 at a given temperature in the automatic analysis device 100 according to the embodiment structured as mentioned above will be described in detail.

First Embodiment

FIG. 2 is an example of a schematic configuration view schematically illustrating the configuration of a heat block as a main portion of the automatic analysis device according to an embodiment of the present invention.

FIG. 3 is a schematic front view in which heat insulation material is omitted in the side configuration of the heat block viewed in the direction of arrow A illustrated in FIG. 2 and a schematic plan view which schematically illustrates the top configuration of the heat block viewed in the direction of arrow B.

FIG. 4 is a schematic sectional view schematically illustrating the sectional configuration of the heat block viewed in a direction of section C-C illustrated in FIG. 3.

Generally, a heater is used to heat the heat block. The heater has a foil-shaped heat generating resistor which generates heat by applying an electrical current. The heat generating resistor is electrically insulated with respect to an outside portion by being sandwiched between a plurality of insulating films. Since the insulating films are stacked and bonded in a manner to sandwich the heat generating resistor, not a small junction face is formed around the heat generating resistor. At both end portions of the heat generating resistor, electrode portions for attachment of electricity feeding lines to supply electric power to the heat generating resistor exist. In the heater manufacturing process, in order to facilitate attachment of the electricity feeding lines to the electrode portions, the electrode portions are wider than the other regions of the heat generating resistor.

The amount of heat generation of the heat generating resistor is in inverse proportion to the cross-sectional area of the heat generating resistor which is perpendicular to the current applying direction. Specifically, when a given electric current is applied to heat generating resistors which are equal in length in the current applying direction and different in width, the narrower resistor generates a larger amount of heat and provides a larger amount of heat generation per unit area (heat generation density). Therefore, the electrode portion provides a lower heat generation density than the other regions. For example, when a strip-shaped heater is attached along the outer circumference of the heat block, a non-heat generating region as a portion of junction of insulating films and a region with low heat generation density as an electrode portion are positioned on the surface where the end regions of the strip-shaped heater in the longitudinal direction face each other. Furthermore, a gap may be generated on the surface where the end regions of the strip-shaped heater in the longitudinal direction face each other. This may cause temperature variation in the outer circumferential direction of the heat block.

In the automatic analysis device according to this embodiment, the heat block 1 is structured to include: a disc 3 for housing a plurality of reaction containers 2 retaining a reaction liquid; a strip-shaped heater 4 for heating the disc 3; and a heat insulation material 5 for preventing heat radiation from the heat block 1.

The disc 3 is made of a material with high thermal conductivity such as aluminum alloy or copper alloy. In the disc 3, a plurality of reaction container installation holes 10 for housing a reaction container 2 are provided at regular intervals along the outer circumference of the disc 3. In the disc 3, the strip-shaped heater 4 for heating the reaction containers 2 is attached to the outer circumference and the heat insulation material 5 is attached to the outside of the strip-shaped heater 4 and the top and bottom surfaces of the disc 3 except the vicinities of the reaction container installation holes 10 in order to prevent unrequired heat radiation from the disc 3. The heat insulation material 5 is made of a material with low thermal conductivity such as polyethylene. The disc 3 is connected to the automatic analysis device 100 through a rotation shaft 9 and can rotate around the rotation shaft 9 by operation of a drive mechanism or the like. Consequently, by moving the reaction container installation hole 10 to the desired position, connection to the sample dispensing tip and reaction container transport mechanism 106 can be made, so the reaction container 2 can be installed or removed. Also, connection to the sample dispensing mechanism 103, reagent dispensing mechanism 110, and reaction liquid suction mechanism 109 can be made, so dispensing and suction of the sample or reagent can be made.

In the example shown in the figure, the disc 3 is disc-shaped with the rotation shaft 9 as the center and the reaction container installation holes 10 are arranged at regular intervals along the outer circumference with the rotation shaft 9 as the center and the strip-shaped heater 4 is wound along the side surface of the disc 3. The heat insulation material 5 is provided on the side surface of the strip-shaped heater 4 and the top and bottom surfaces of the disc 3 except the vicinities of the reaction container installation holes.

The strip-shaped heater 4 is attached along the outer circumference of the disc 4 and in the example shown in the figure, it is positioned so that the end regions of the strip-shaped heater 4 face each other.

The strip-shaped heater 4 includes: a heat generating resistor 6 which generates heat by applying an electric current; an insulating film 7 which electrically insulates the heat generating resistor 6 from the outside; and a first electricity feeding line 8 and a second electricity feeding line 8a which supply power to the heat generating resistor 6.

The insulating film 7 electrically insulates the heat generating resistor 6 from the disc 3, heat insulation material 5, and the outside. Also, for example, the insulating film 7 is structured with a first insulating film 7a and a second insulating film 7b as shown in FIG. 4, and the heat generating resistor 6 is sandwiched between the first insulating film 7a and second insulating film 7b; and since the first insulating film 7a and second insulating film 7b are directly joined with a bond or the like, a not a small junction region 7c in which the insulating film 7a and insulating film 7b are joined exists around the heat generating resistor 6.

The heat generating resistor 6 is made of a material which generates heat by applying electric current, such as stainless steel foil or nichrome foil. The heat generating resistor 6 is strip-shaped with a uniform thickness in the longitudinal direction as shown in the schematic front view in FIG. 3. The heat generating resistor 6 has a first electrode portion 6a at one end in the longitudinal direction and a second electrode portion 6b at the other end. The first electricity feeding line 8 is attached to the first end portion 6a and the second electricity feeding line 8a is attached to the second end portion 6b.

In the example in FIG. 3, the first electrode portion 6a and second electrode portion 6b are wider than the other regions of the heat generating resistor 6. The vicinities of the first electrode portion 6a and second electrode portion 6b are narrow portions 6c which are narrower than the other regions of the heat generating resistor 6.

In addition, the heat generating resistor 6 is formed in a manner to be folded in the longitudinal end regions of the strip-shaped heater 4, and the narrow portions 6c are adjacent to each other.

The length of the strip-shaped heater 4 is made shorter than the outer circumferential length of the disc 3 in order to prevent overlapping when it is attached to the disc 3, so not a small gap is generated in the longitudinal end regions of the strip-shaped heater 4. Furthermore, as mentioned above, since the junction portions 7c of the insulating film 7 around the heat generating resistor 6 exist, a non-heat generating region with width W3 is generated in the area where the end regions of the strip-shaped heater 4 face each other, as shown in FIG. 3.

FIG. 5 is an example of modifying the shape of the narrow portion 6c of the heat generating resistor 6 in the schematic front view in FIG. 3.

The width of the narrow portion 6c of the heat generating resistor 6 need not be uniform; for example, as shown in FIG. 5, air voids may be made in the heat generating resistor 6 so that the narrow portion 6c has a smaller width. The figure shows that five holes are made in both the end portions. The number of holes and the hole shape are not limited to those shown in FIG. 5.

Next, the function and effect of the heat block 1 structured as mentioned above will be described in detail referring to the schematic front view and schematic plan view of the heat block 1 as shown in FIG. 3.

In the schematic front view in FIG. 3, W1, W2, and W3 represent the ranges of the strip-shaped heater 4 divided in the longitudinal direction: W1 represents a range in which the narrow portion 6c and first electrode portion 6a or second electrode portion 6b of the heat generating resistor 6 are located; W2 represents a range in which the heat generating resistor 6 is located; and W3 represents a non-heat generating region range in which the heat generating resistor 6 does not exist. W1, W2, and W3 correspond to angle ranges θ1, θ2, and θ3 of the disc 3 with the rotation shaft 9 as the center in the schematic plan view in FIG. 3, respectively. Further, r1 denotes the radius of the outer circumference of the disc 3 and r2 denotes the pitch radius on which reaction container housing holes are arranged.

The amount of heat generation of the heat generating resistor 6 is proportional to electric resistance value and the square of electric current value according to Joule's law. The electric resistance value is inversely proportional to the cross-sectional area of the heat generating resistor 6 which is perpendicular to the electric current applying direction. Specifically, when an electric current is applied to heat generating resistors 6 which are the same in length in the electric current applying direction and different in width, the narrower one can be said to generate a larger amount of heat and provide a larger amount of heat generation per unit area (heat generation density). The first electrode portion 6a and second electrode portion 6b are wider than the other heat generating resistor 6 and thus provide a lower heat generation density than the other heat generating resistor 6. On the other hand, the narrow portion 6c is narrower than the other heat generating resistor 6 and thus provides a higher heat generation density than the other heat generating resistor 6.

Therefore, in the range W1 in FIG. 3, the first electrode portion 6a and second electrode portion 6b with lower heat generation density exist but the heat generation density of the narrow portion 6c is high, so the range W1 provides a higher heat generation density than the range W2.

When the material and shape are the same, the temperature of a region with higher heat generation density rises more. Therefore, in the strip-shaped heater 4, the temperature of angle range θ1 shown in the schematic plan view in FIG. 3 is higher than that of θ2 and θ3.

On the other hand, regarding the amount of heat generation of the strip-shaped heater 4, since heat is transmitted by thermal conduction according to a temperature gradient in an object, heat is transmitted in the direction of the rotation shaft 4 of the disc 3 having a lower temperature than the strip-shaped heater 4, except the amount of heat discharged to the air through the heat insulation material 5 attached to the outside of the strip-shaped heater 4. Although the range θ3 is a non-heat generating region, as heat transmission proceeds in the direction of the rotation shaft 9 of the disc 3, heat is transmitted from θ1 of higher temperature according to a temperature gradient and as a result, the temperature rises.

In other words, the drop in the temperature of the range θ3 as the non-heat generating region is compensated for by increasing the heat generation density of θ1 so that the temperature distribution of the reaction containers located on the pitch circle with radius r2 is uniformized.

FIG. 6 is a schematic front view illustrating an example of modifying the state of attachment of the electricity feeding line 8 in the schematic front view in FIG. 3.

In the automatic analysis device according to this embodiment, the first electricity feeding line 8 of the strip-shaped heater 4 is attached in a manner to extend in the direction from the first electrode portion 6a to the second electrode portion 6b, and the second electricity feeding line 8a is attached in a manner to extend in the opposite direction from the second electrode portion 6b to the first electrode portion 6a.

Consequently, wire connection to the power source can be made while the strip-shaped heater 4, first electricity feeding line 8, and second electricity feeding line 8a are bundled without protruding from the outer shape of the heat block. Another method to reduce temperature variation among a plurality of reaction liquids held in the heat block may be to increase the thickness of the heat block and extend both the end regions of the strip-shaped heater 4 in the thickness direction; however, the increase in the thickness of the heat block would cause an increase in the overall size or weight. In contrast, according to the present invention, the heat block can be uniformly heated without largely changing the size of the heat block.

In this embodiment, an explanation has been made on the assumption that the heat block is disc-shaped, but the present invention is not limited thereto. For example, a heater may be attached around a rectangular parallelepiped block.

Second Embodiment

Next, an automatic analysis device according to another embodiment of the present invention will be described referring to FIGS. 7 and 8. In the explanation given below, the same elements as in the abovementioned automatic analysis device are designated by the same reference signs in the figures and detailed description thereof is omitted. FIG. 7 is an example of a schematic configuration view schematically illustrating the configuration of the heat block 1 as a main portion of the automatic analysis device 100 according to the second embodiment.

FIG. 8 is a schematic front view in which the heat insulation material 5 is omitted in the side configuration of the heat block 1 viewed in the direction of arrow A illustrated in FIG. 7 and a schematic plan view which schematically illustrates the top configuration of the heat block 1 viewed in the direction of arrow B.

The automatic analysis device 100 according to this embodiment has narrow portions 6c with a small width near the first electrode portion 6a and the second electrode portion 6b of the heat generating resistor 6, and the first electrode portion 6a, second electrode portion 6b, and narrow portions 6c are disposed side by side in a direction perpendicular to the longitudinal direction of the strip-shaped heater 4.

As shown in the schematic front view in FIG. 8, the heat generating resistor 6 is strip-shaped with a uniform thickness along the longitudinal direction of the insulating film 7. Width A of the narrow portion 6c of the heat generating resistor 6 is smaller than width B of the other regions. Width A need not be uniform in the electric current applying direction.

Here, in the heat generating resistor 6, electric current is not applied to the end side area of the heat generating resistor 6 from the first end portion to which the first electricity feeding line 8 is joined, and the end side area of the heat generating resistor 6 from the second end portion to which the second electricity feeding line 8a is joined, so no heat is generated in the areas. Therefore, a non-heat generating region exists in the circumferential direction of the heat block 1.

Next, the function and effect of the heat block structured as mentioned above will be described in detail referring to the schematic front view and schematic plan view of the heat block 1 as shown in FIG. 8.

In the schematic front view in FIG. 8, W1, W2, and W3 represent the ranges of the strip-shaped heater 4 divided in the longitudinal direction: W1 represents the range of the narrow portion 6c; W2 represents the range of the heat generating resistor 6; and W3 represents the range of the non-heat generating region. W1, W2, and W3 correspond to angle ranges θ1, θ2, and θ3 of the disc 3 with the rotation shaft 9 as the center in the schematic plan view in FIG. 8, respectively. r1 denotes the radius of the outer circumference of the disc 3 and r2 denotes the pitch radius on which reaction container housing holes are arranged.

Width B of the heat generating resistor 6 shown in FIG. 8 is almost uniform. On the other hand, a narrow portion 6c lies in the range W1 in FIG. 8, so the range W1 provides a higher heat generation density than the range W2.

On the outer circumference of the disc 3, the temperature of the angle range θ1 shown in the schematic plan view in FIG. 8 is higher than in θ2 and θ3 and heat transmission occurs in the circumferential direction from the range θ1 to the range θ2 and range θ3. On the other hand, since the range θ3 is a non-heat generating region range, the rise in the temperature due to the strip-shaped heater 4 does not occur, but the temperature is lower than in the range θ1, so according to a temperature gradient, heat is transmitted from the region of θ2 and as a result, the temperature rises.

In other words, the drop in the temperature of the range θ3 of the non-heat generating region is compensated for by increasing the heat generation density of θ1, so that the temperature distribution of the reaction containers located on the pitch circle with radius r2 is uniformized.

FIG. 9 is a schematic front view illustrating an example of modifying the state of attachment of the electricity feeding line 8 in the schematic front view in FIG. 8.

In the automatic analysis device according to this embodiment, the first electricity feeding line 8 of the strip-shaped heater 4 is attached in a manner to extend in the direction from the first electrode portion 6a to the second electrode portion 6b, and the second electricity feeding line 8a is attached in a manner to extend in the opposite direction from the second electrode portion 6b to the first electrode portion 6a.

Consequently, wire connection to the power source can be made while the strip-shaped heater 4, first electricity feeding line 8, and second electricity feeding line 8a are bundled without protruding from the outer shape of the heat block.

Third Embodiment

Next, an automatic analysis device 100 according to a further embodiment of the present invention will be described referring to FIGS. 10 and 11. In the explanation given below, the same elements as in the abovementioned automatic analysis device 100 are designated by the same reference signs in the figures and detailed description thereof is omitted.

FIG. 10 is an example of a schematic configuration view schematically illustrating the configuration of the heat block 1 as a main portion of the automatic analysis device 100 according to the further embodiment.

FIG. 11 is a schematic front view in which the heat insulation material 5 is omitted in the side configuration of the heat block 1 viewed in the direction of arrow A illustrated in FIG. 10 and a schematic plan view which schematically illustrates the top configuration of the heat block 1 viewed in the direction of arrow B.

In the automatic analysis device 100 according to this embodiment, the heat generating resistor 6 has a uniform width, and the junction portion between the first electrode portion 6a and the first electricity feeding line and the junction portion between the second electrode portion 6b and the second electricity feeding line are positioned on the end portion sides of the heat generating resistor 6 with respect to the position aligned in the direction perpendicular to the longitudinal direction of the strip-shaped heater 4.

Next, the function and effect of the heat block 1 structured as mentioned above will be described in detail referring to the schematic front view and schematic plan view of the heat block in FIG. 11.

In the schematic front view in FIG. 11, width A of the heat generating resistor 6 is uniform throughout the strip-shaped heater 4, so the heat generation density of the heat generating resistor 6 is uniform.

In the schematic plan view in FIG. 11, the junction portion between the first electrode portion 6a and the first electricity feeding line and the junction portion between the second electrode portion 6b and the second electricity feeding line 8a overlap at the same angle in the circumferential direction of the heat block. Since the heat generating resistor 6 generates heat by applying an electric current, the end portion side of the heat generating resistor 6 from the junction portion is a non-heat generating region.

Here, in the circumferential direction of the heat block 1, the heat generating resistor 6 of the strip-shaped heater 4 lies at all angles and the heat generating resistor 6 generates heat at all angles by applying an electric current, so the temperature distribution of the reaction containers located on the pitch circle with radius r2 is uniformized.

Next, in order to explain the effects of the present invention more concretely, the function of the heat block 1 as a main portion of the automatic analysis device shown in FIGS. 2, 3, and 4 will be described.

FIG. 12 is a graph which schematically illustrates the temperature distribution of the heat block 1 according to the first embodiment. In the temperature distribution graph shown in FIG. 12, the vertical axis denotes temperature. The horizontal axis denotes angles up to 360° in the clockwise direction with the rotation shaft 9 as the center at y=0 as θ=0°. The center of the range W3 (θ3) of the non-heat generating region is on 90° in the horizontal axis. In FIG. 12, the solid line denotes temperature distribution on the pitch circle r2 of the disc 3 where the reaction liquid installation holes are located and the chain line denotes temperature distribution of the heat generating resistor 6 on the strip-shaped heater 4.

In the temperature distribution on the strip-shaped heater 4, the temperature in the range θ1 with higher heat generation density is higher than in the ranges θ2 and θ3. On the other hand, in the temperature distribution on the pitch circle r2 where the reaction liquid installation holes are located, temperature variation is suppressed and the temperature distribution is almost uniform at all angles.

As mentioned above, the temperature drop in the range θ3 is compensated for by heat generation in θ1 with high heat generation density so that the temperature distribution is uniformized.

The present invention is not limited to the above embodiments and includes various modifications thereto. For example, the above embodiments have been described in detail for easy understanding of the present invention; however, the present invention is not limited to a configuration which includes all the elements described above. An element of one embodiment may be replaced by an element of another embodiment or an element of one embodiment may be added to another embodiment. Also, for each embodiment, addition, deletion, or replacement of an element can be made. For example, the above disc 3 may not be disc-shaped but it may be polygonal; the reaction container installation holes 10 may be disposed at irregular intervals; and the strip-shaped heater 4 may be horseshoe-shaped and attached to the back side of the disc 3.

REFERENCE SIGNS LIST 1 heat block
2 reaction container
3 disc
4 strip-shaped heater
5 heat insulation material
6 heat generating resistor
6a first electrode portion
6b second electrode portion
6c narrowing portion
7 insulating film
7a first insulating film
7b second insulating film
7c junction region
8 first electricity feeding line
8a second electricity feeding line
9 rotation shaft
10 reaction container installation hole
100 automatic analysis device
101 operation table
102 sample rack mounting portion
103 sample dispensing mechanism
104 sample dispensing tip and reaction container holding member mounting portion
105 sample dispensing tip and reaction container discarding hole
106 sample dispensing tip and reaction container transport mechanism
107 sample tip mounting position
108 reaction container stirring device
109 reaction liquid suction mechanism
110 reagent dispensing mechanism
111 reagent refrigerator
112 detection unit
113 reagent disc
114 reagent container
115 reagent disc cover
116 dispensing hole
117 sample rack
118 sample container
119 sample dispensing tip and reaction container holding member
120 sample dispensing tip
121 control portion

The invention claimed is:

1. An automatic analysis device, comprising:
a heat block which includes a plurality of positions on which reaction containers in which reaction liquid mixing a reagent and a sample is injected are mounted; and
a strip-shaped heater which heats the heat block,
wherein the strip-shaped heater is attached around an outer circumference of the heat block so that both end regions of the strip-shaped heater face each other in a horizontal plane,
wherein the strip-shaped heater includes a heat generating resistor which generates heat by applying an electric current, an insulating film that sandwiches the heat generating resistor to electrically insulate the heat generating resistor, a first electricity feeding line and a second electricity feeding line which are respectively attached to both end portions of the heat generating resistor and supply power to the heat generating resistor,
wherein the heat generating resistor has a width dimension parallel to the axis of the heat block,
wherein both ends of the insulating film are parallel to the axis of the heat block,
wherein the strip-shaped heater has a first predetermined area and a second predetermined area in a circumferential direction which respectively correspond to a first angle and a second angle with respect to the axis of the heat block,
wherein in the first area, the heat generating resistor has a first width narrower than a second width of the heat generating resistor in the second area,
wherein the first area includes the first electricity feeding line,
wherein a majority of the heat generating resistor has the second width,
wherein the heat generating resistor has a U-shape within the first predetermined area such that a direction of current changes from a first direction along the circumferential direction to a second direction which is opposite to the first direction according to the U-shape of the heat generating resistor.

2. The automatic analysis device according to claim 1, wherein the first electricity feeding line extends in a direction opposite the second electricity feeding line.

3. The automatic analysis device according to claim 1, wherein the strip-shaped heater has a third predetermined area in the circumferential direction which corresponds to a third angle with respect to the axis of the heat block,
wherein in the third area, the heat generating resistor does not exist.

4. The automatic analysis device according to claim 1, wherein current travels in a second direction in the heat generating resistor that is in the second area, and
wherein the current travels in a first direction that is opposite to the second direction in the heat generating resistor that is in the first area.

5. An automatic analysis device, comprising:
a heat block which includes a plurality of positions on which reaction containers in which reaction liquid mixing a reagent and a sample is injected are mounted; and
a strip-shaped heater which heats the heat block,
wherein the strip-shaped heater is attached around an outer circumference of the heat block, wherein the strip-shaped heater includes a heat generating resistor which generates heat by applying an electric current, an insulating film that sandwiches the heat generating resistor to electrically insulate the heat generating resistor, a first electricity feeding line and a second electricity feeding line which are respectively attached to both end portions of the heat generating resistor and supply power to the heat generating resistor, wherein the electric current is applied in a circumferential direction around the heat generating resistor, and wherein the portions of the heat generating resistor through which the first electricity feeding line and the second electricity feeding line are attached have a uniform cross-sectional area, wherein the heat generating resistor has a width dimension parallel to the axis of the heat block, wherein a first end of the insulating film has a plurality of first edges that are parallel to each other and are connected by a third edge that is parallel to the circumferential direction, wherein a second end of the insulating film has a plurality of second edges that are parallel to each other and are connected by a fourth edge that is parallel to the circumferential direction, wherein the first edges of the first end are parallel to the second edges of the second end and the first edges of the first end respectively face the second edges of the second end, wherein the third edge of the first end is parallel to the fourth edge of the second end and face one another, and wherein a majority of the heat generating resistor has a first width.

* * * * *